United States Patent [19]

Witte et al.

[11] 4,126,861
[45] Nov. 21, 1978

[54] PULSE DOPPLER RANGING SYSTEM (U)

[75] Inventors: Joseph J. Witte, Silver Spring, Md.; Raymond H. Femenias, Washington, D.C.

[73] Assignee: The United States of America as represented by the Secretary of the Army, Washington, D.C.

[21] Appl. No.: 626,658

[22] Filed: Mar. 23, 1967

[51] Int. Cl.² ............ G01S 7/36; G01S 9/14; H03B 3/08
[52] U.S. Cl. .................. 343/13 R; 331/18; 331/47; 343/7.3; 343/18 E
[58] Field of Search .......... 343/13, 17.5, 7.7, 7.3, 343/13 R, 18 E; 331/18, 47

[56] References Cited
U.S. PATENT DOCUMENTS

| | | | |
|---|---|---|---|
| 3,066,289 | 11/1962 | Elbinger | 343/7.7 |
| 3,096,514 | 7/1963 | Zimmer | 343/7.7 |
| 3,308,458 | 3/1967 | Schulze | 343/13 X |
| 3,308,459 | 3/1967 | Carlsson et al. | 343/13 |

Primary Examiner—Malcolm F. Hubler
Attorney, Agent, or Firm—Nathan Edelberg; Robert P. Gibson; Saul Elbaum

[57] ABSTRACT

A pulse radar distance measuring system in which the transmitter oscillator is injection-locked to a reference oscillator through a directional coupler. The pulses from the reference oscillator are of a duration which is approximately equal to the time required for the transmitted signal to travel to a target and return. The output of the transmitter oscillator is coupled to the transmitting antenna through the above mentioned directional coupler. The received target return signal is compared with the signal from the reference oscillator in a balanced mixer. The output of the mixer is coupled to a range-gated receiver and then to decision circuits for utilization.

6 Claims, 1 Drawing Figure

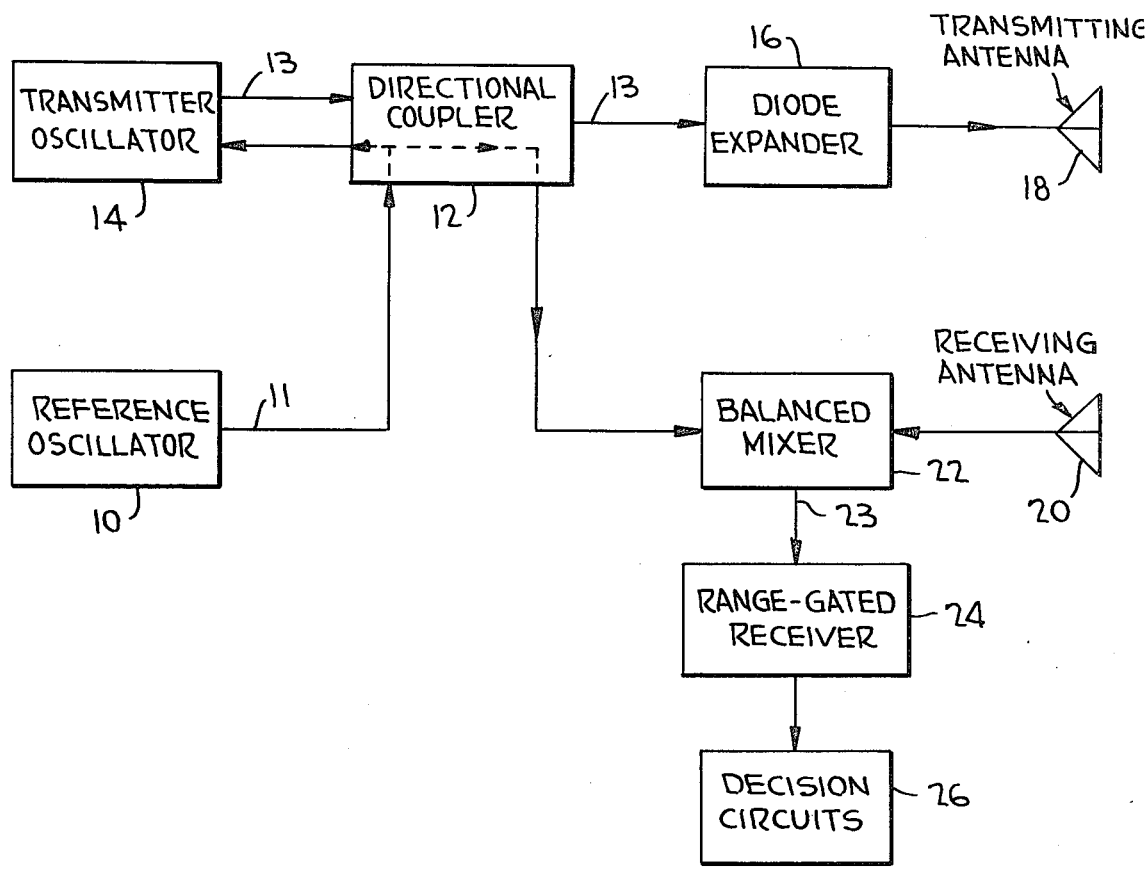

PULSE DOPPLER RANGING SYSTEM (U)

In pulse radar systems, as is well known, the transmitter radiates a periodic series of pulses of radio frequency energy and measures the distance to an object by determining the time required for a given pulse to travel to the object and return to a receiver located at the same point as the transmitter. If either the measuring system or the target is moving relative to the other, the doppler effect will vary the frequency of the echo radio frequency pulses at the receiver.

In pulse doppler ranging systems presently in use it has been found that a jamming signal of sufficient strength directed toward the transmitting antenna will readily enter the transmitting oscillator, because of the close coupling that exists between the antenna and oscillator, thereby, capturing the transmitter oscillator and forcing it into coherence with the jamming signal. Conventionally, the receivers in such radar systems have a first stage mixer which compares the target return signal with the transmitted signal. In the event that the transmitter oscillator has been captured by a jamming signal it can be seen that the jamming signal will readily pass through the mixer because of the phase coherence which now exists between the jamming signal and the transmitter signal which serves as the reference signal for the mixer. One major application of radar ranging systems is in proximity fuzes, and should a jamming signal pass through the receiver mixer in the fuze, it could cause premature firing of the projectile on which the fuze is mounted.

Prior to this invention delay lines in the mixer reference channel have been used in pulse radar systems; the delay line is connected to receive a portion of the transmitted signal; it delays that signal by an amount nominally equal to the time required for the transmitted signal to travel to the target and return; and the delayed signal is coupled to the receiver mixer to provide a reference signal to be mixed with the target return signal. The delay lines required for operation at the microwave frequencies used in radar ranging systems have been found to be expensive, bulky, and extremely lossy, the last disadvantage being the most significant. Ordinarily, when using such delay lines in the manner described above, because of the losses introduced by the delay lines, large amounts of power have to be extracted from the transmitted signal or expensive and bulky amplifiers have to be used in order to have sufficient power to operate the receiver mixer. Further, presently available microwave frequency delay lines are not variable, and, if it is desired that the delay be changed, a different delay line will have to be substituted in the system.

It is, therefore, an object of this invention to reduce the susceptibility of radar distance measuring systems to capture by interfering signals.

Another object is to provide the advantages of introducing a delay in the receiver mixer reference channel without introducing the disadvantages usually found in presently available delay lines.

A further object of this invention is to reduce the zero range response or "leak-through" experienced in radar distance measuring systems.

These and other objects and features of this invention and the means of attaining them will become apparent upon reference to the following description taken in conjunction with the drawing wherein is shown a block diagram of a typical embodiment of this invention.

In the drawing, transmitter oscillator 14, as is usual in radar distance measuring systems, generates a periodic series of pulses of radio frequency energy of short duration. These pulses are of a relatively high level (approximately 100 watts), and the specific pulse duration is determined by the particular range resolution requirements, sensitivity of the systems, and peak-average power considerations for the particular transmitter being used. The pulses from oscillator 14 are coupled to transmitting antenna 18 for radiation toward potential targets. Generally, in order to maximize power transfer to the antenna, close coupling will exist between the transmitter oscillator and antenna. This, of course, will offer easy access to the transmitter oscillator for jamming signals, and if the jamming signal is of sufficient strength, it can force the transmitter oscillator into coherence with it. This invention substantially eliminates this possibility by having the pulse frequency of transmitter oscillator 14 determined by an external source isolated from the antenna. In the illustrated embodiment a reference oscillator 10 generates relatively low level (approximately 1 to 2 watts peak), long duration pulses with the pulse duration being selected to correspond to the maximum range desired. Transmitter oscillator 14 is then injection-locked to the output 11 of reference oscillator 10 by being coupled to it through directional coupler 12. Reference oscillator 10 is well isolated from transmitting antenna 18 by directional coupler 12 because even the most inexpensive directional couplers have a directivity of 20b. or better. Therefore, the frequency and phase of transmitter oscillator 14 is determined exclusively by reference oscillator 10.

A portion of the reference signal is routed by directional coupler 12 where it is appropriately attenuated, to a balanced mixer 22 where the reference signal is mixed with the target-return signal obtained from receiving antenna 20. Because the duration of the pulse from reference oscillator 10, which provides the phase reference for mixer 22, has been set to correspond to the time required for a transmitted pulse to travel to the target and return, the results achieved will be the same as those obtained when the transmitter signal is delayed by the same amount of time as in the prior art devices. Therefore, the delay line, the characteristics of which are often objectionable in this type of application, has been eliminated by this invention while achieving the same results as if one were present. It is important to note that the pulses generated by reference oscillator 10 may be easily varied in width when it is desired to change the maximum range.

At this point it is appropriate to point out also that the spurious signals seen at the mixer output 23 which can be attributed to zero-range response or "leak through" are substantially below those of pulse overlap systems. Directional coupler 12 serves to effectively isolate reference oscillator 10 from transmitting antenna 18 in both directions making the amount of reference signal that might appear on that antenna minimal. Of course, the transmitter oscillator 14 is turned off for a substantial part of the duration of the reference pulse. It can then be stated that with an appropriately time-gated receiver the unwanted close-in range response is reduced by a factor which is the ratio of transmitter peak power to radiated reference oscillator power. In using typical low cost components at lower microwave frequencies, this ratio has been found to closely approximate 30db. It is apparent that this ratio can be enhanced by decreasing the radiated reference oscillator power, and this may be accomplished by placing diode expander 16 between output 13 of directional coupler 12 and transmitting antenna 18.

For utilization mixer output 23 is coupled to a range-gated receiver 24 of any well-known type which can further reduce unwanted responses by being gated to yield only the desired non-zero range information. The output of the range-gated receiver 24 is illustrated as being connected to decision circuits 26 which may be of any type suitable to the application in which the radar distance measuring system is being used.

While the transmitter in the typical embodiment described above is depicted as an injection-locked oscillator, it is contemplated that a pulsed amplifier driven by transmitter oscillator 14, controlled by reference oscillator 10, and providing sufficient isolation could be used. If the close-in range response of the system is of primary importance, the transmitter oscillator 14 could be used to injection-lock the relatively low level reference oscillator 10.

While a particular embodiment of this invention has been described, it will be obvious to those skilled in the art that various changes and modifications may be made without departing from the invention, and it is, therefore, intended in the appended claims to cover all such changes and modifications as fall within the true spirit and scope of the invention.

We claim as our invention:

1. An improved pulse radar distance measuring system wherein interfering signals are prevented from disrupting the operation of said system and wherein no delay means is required for providing a portion of the transmitted signal to be compared with the received signal, comprising:
   (a) first means for producing short duration pulses of radio frequency energy which are radiated toward potential targets,
   (b) second means providing a reference pulse, the duration of which corresponds to the time required for said radiated signal to travel to and return from a target at a predetermined maximum range, and which is adapted to control the frequency and phase of said first means while being isolated from interfering signals,
   (c) mixer means adapted to receive a portion of said reference pulse and the target return signal, and
   (d) utilization means adapted to receive the output of said mixer means to provide distance information in the desired manner.

2. The improved pulse radar distance measuring system of claim 1 in which said utilization means includes a range-gated receiver with the output of said receiver being connected to the appropriate decision circuits.

3. An improved pulse radar distance measuring system wherein interfering signals are prevented from disrupting the operation of said system, unwanted close-in responses are reduced, and the need for a delay line is eliminated while producing like results, comprising:
   (a) a power oscillator generating short duration pulses of radio frequency energy,
   (b) a reference oscillator generating pulses of longer duration and lower power relative to the output of said power oscillator, the duration of said pulses corresponding to the time required for a transmitted signal to travel to and return from a target at a predetermined maximum range,
   (c) a mixer, a first input of which is connected to a receiving antenna,
   (d) a directional coupler connecting the output of said power oscillator to a transmitting antenna, and connecting the output of said reference oscillator to said power oscillator and to a second input of said mixer whereby the frequency and phase of said power oscillator is controlled by said reference oscillator, said reference oscillator is isolated from said transmitting antenna, and said reference oscillator provides a reference signal for said mixer,
   (e) a range-gated receiver having an input connected to the output of said mixer, and
   (f) utilization means connected to the output of said range-gated receiver.

4. The improved pulse radar distance measuring system of claim 3 having an expander means with the input of said expander means being connected to the transmission output of said directional coupler and the output of said expander means being connected to said transmitting antenna whereby the ratio of the transmitter peak power to the radiated reference oscillator power is increased.

5. The improved pulse radar distance measuring system of claim 3 in which the control of said oscillator by said reference oscillator is accomplished by injection-locking.

6. The method of providing the equivalent of a delayed sample of the transmitted signal to the receiver mixer in a pulse radar distance measuring system, comprising the steps of generating a pulse, coupled to and locking the output of a transmitter oscillator in said system, the duration of which corresponds to the time required for a transmitted signal to travel to and return from a target at a predetermined maximum range, and connecting said pulse to said receiver mixer.

* * * * *